July 11, 1961 F. E. WRIGHT ET AL 2,992,027

DUAL-LIP SHAFT SEAL

Filed Sept. 27, 1957

INVENTORS:
CHARLES G. STUCKE
FOSTER E. WRIGHT
BY Robert Henderson

ATTORNEY

2,992,027
DUAL-LIP SHAFT SEAL

Foster E. Wright, Perinton, and Charles G. Stucke, Palmyra, N.Y., assignors to Garlock Inc., a corporation of New York
Filed Sept. 27, 1957, Ser. No. 686,652
5 Claims. (Cl. 288—3)

This invention relates to sealing devices such as are employed to close effectively an annular space between a shaft and an opening provided for the shaft in a portion of a machine. Such seals are commonly provided to prevent leakage of lubricant along the shaft and sometimes are provided with more than one annular sealing lip to achieve the stated purpose more effectively. The invention relates more particularly to such sealing devices having two independently functioning, annular sealing lips which may both be arranged to face in one and the same direction or may be arranged to face in opposite directions. In the latter arrangement, one of the lips may face toward lubricant within the machine and the other lip may face oppositely and, in addition to a function which it may perform as a secondary lubricant seal, it may serve to exclude dust, grit or other foreign matter from the lubricant supply and thereby prolong the usefulness of the lubricant.

The present invention is illustrated and described herein as embodied in seals having the last-mentioned arrangement without, however, limiting the invention to that particular arrangement.

Figure 1:
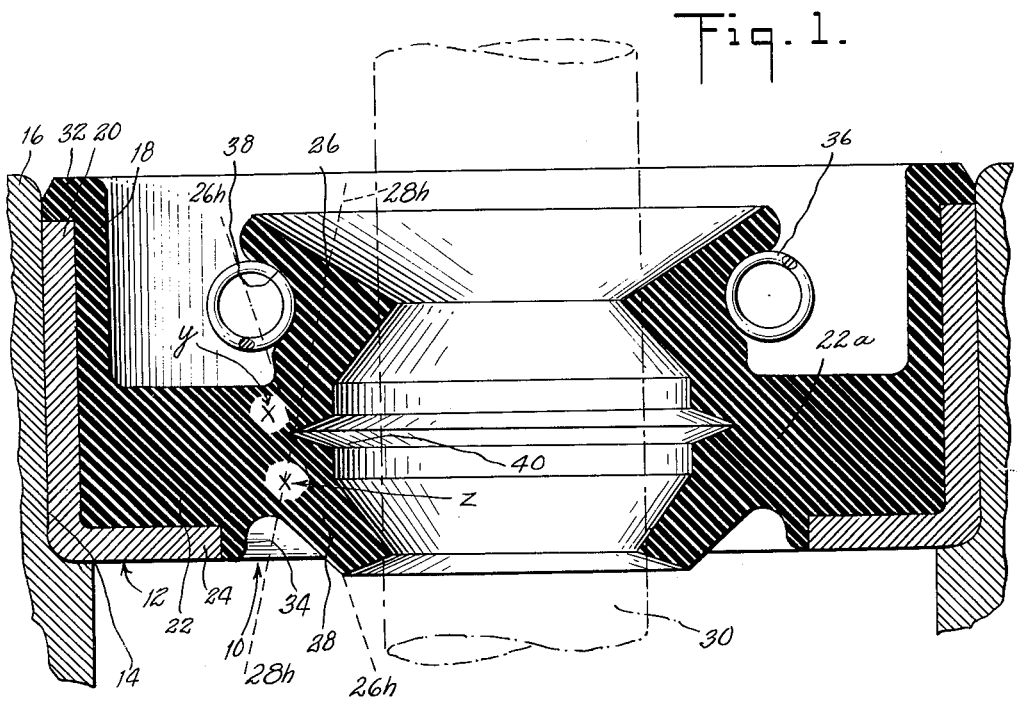
Figure 2:
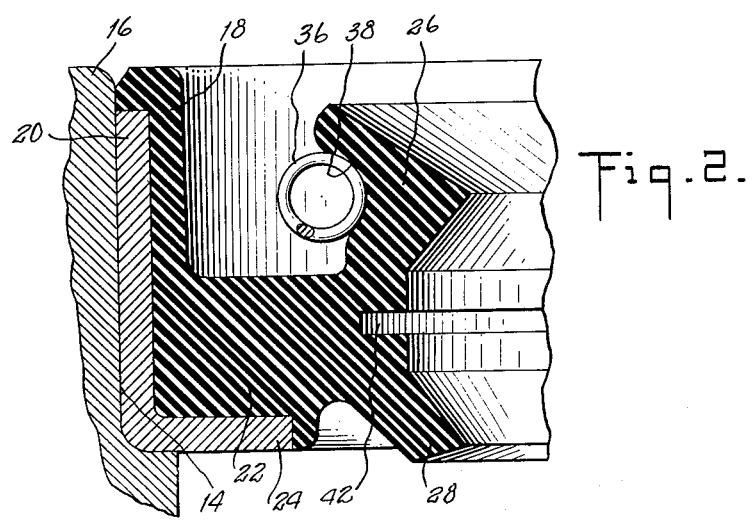

In the accompanying drawing:

FIGURE 1 is a central, axial, sectional view of a shaft seal according to a preferred embodiment of this invention; and FIG. 2 is a fragmentary, similar sectional view (approximately halved) of a modified embodiment of the invention.

The seal illustrated in FIG. 1 comprises an annular sealing element 10 of relatively soft rubber or more or less equivalent soft, resilient, rubber-like material, bonded into or otherwise fixedly secured within a shell 12 of steel or other suitable metal or other material. The shell is of such size that it may be press-fitted into a shaft opening 14 of a fragmentarily-shown machine-casing portion 16 to effect a good stationary seal with respect to the latter.

The sealing element 10, as illustrated, is formed with an outer, cylindrical flange 18 which is disposed intimately within a cylindrical flange 20 of the shell, a radial web or body 22 which is disposed intimately within said flange 20 and against an inturned radial flange 24 of the shell, a primary sealing lip 26, extending axially in one direction from the inner periphery of the body 22, and a secondary sealing lip 28, extending axially in the opposite direction from the inner periphery of the body 22.

The inside diameters of the lips 26 and 28, as manufactured, are smaller than the diameter of a shaft 30 (indicated in dot-and-dash lines) with which the seal is intended to be used so that when said lips are stretched somewhat in pushing the seal endwisely onto the shaft upon installation of the seal, the resiliency reaction in said lips will cause them to engage the shaft firmly to effect a sliding seal therewith as the shaft rotates in operation thereby constituting said lips as slide-sealing means. If desired, the sealing element 10 may be designed to overlie the end edges of the shell's flanges 20 and 24 as at 32, 34, to provide a more complete seal between the sealing element 10 and the shell 12. The machine-casing portion 16 and the shaft 30 are sometimes hereinafter referred to as "machine elements."

As is common in many sealing devices, a circular, garter, coil spring 36 may be provided and disposed under tension about the primary sealing lip 26 and in a groove 38 formed in said lip to maintain the latter positively in sealing engagement with the shaft at all points thereround even in the presence of eccentricity, whipping or other irregular operating condition of the shaft. In some machines or under some conditions, the seal need not be provided with such a garter spring.

The secondary lip 28, as illustrated, is not as thick as lip 26, is of simpler design and is not provided with any garter spring, although, of course, the lip 28 could be designed to have such a spring and could be provided with such a spring. A seal such as is illustrated would ordinarily be so disposed on the shaft that primary lip 26 would serve to prevent or oppose leakage of lubricant along the shaft from within the machine casing while secondary lip 28 would serve not only as a secondary lubricant seal but also to exclude dirt, etc., from the part of the machine where the lubricant is located.

Efforts have heretofore been made to provide, in such a seal, two lips both integral with a single or common web or body portion such as is shown at 22, to obviate the need for providing two complete, separate, resilient sealing elements each having its own web or body portion such as 22. Such efforts, however, have not been as satisfactory as could be desired because the connection between two sealing lips, through the rubber of the sealing element, has been so direct in prior structures that flexing of one sealing lip upon installation and/or during operation would influence the other sealing lip unpredictably, with the result that it has been impossible to achieve maximum efficiency in both sealing lips in a device wherein a resilient sealing element with two such lips have had only a single or common web or body portion.

The present invention overcomes the stated difficulty by providing for each of the lips 26 and 28 to adjoin an unconfined resilient portion 22a of the web or body 22 quite independently of each other, or, stated differently, any connection between the two lips is indirect and only circuitous through said portion 22a. To accomplish this, the unconfined resilient portion 22a of the sealing element 10 is formed with a deep, inner, circular recess or groove 40, the depth of said groove being such as to provide a pronounced breach between the lips 26 and 28.

The provision of said breach serves to remove an integral portion of the rubber sealing element 10, which portion, in prior structures having two lips, operated to transmit flexing reactions from one lip to the other. Stated differently, in the absence of the groove 40 or equivalent annular recess, pivoting of the primary sealing lip 26 with reference to the body 22 when the device is forced upon a shaft, or when the shaft in operation pursues some irregular movement, would occur about a point within the area of what, in the present disclosure, is the groove 40, and, when such pivoting of lip 26 occurred about such a point, the pivoting would set up some internal stresses in the secondary sealing lip 28 where the latter adjoins the body 22. In that situation, the pivotal action of the secondary sealing lip 28 about the body 22 could not be independent of the pivoting of the sealing lip 26. Where the groove 40 or equivalent groove has not been provided, there is a direct connection between the lips 26 and 28 with the result that any pivoting of the secondary sealing lip 28 would undesirably affect the pivoting of the primary sealing lip 26, and vice versa.

By providing the groove 40 or equivalent means the lips 26 and 28, respectively, are caused to hinge upon the remainder of the flexible sealing element 10 along lines indicated by broken lines 26h—26h and 28h—28h which extend more nearly axially than radially; thus, any pivoting of the primary sealing lip 26 will occur approximately at the point marked y in FIG. 1 and the pivoting of the secondary sealing lip 28 will occur approximately at the point marked z in said figure. It will be observed that the points y and z are considerably removed from each other and that there is a relatively substantial mass of rubber between the two said points, so that any internal stresses set up in the rubber element 10 by flexing of one of the sealing lips cannot find their way to the other sealing lip; hence, the actions of the two sealing lips 26, 28 are independent of each other. This enables the seal to be designed so that the actions of the two lips 26, 28 will be predictable and in accordance with the actions desired by the designer of the seal.

The second illustrated embodiment of the invention shown in FIG. 2 differs from the first embodiment only in that an inner, circular recess or groove 42 has approximately parallel side walls and a cylindrical bottom wall while the groove 40 merely has two walls adjoining at a sharp angle. The disclosure of FIG. 2, in addition to the disclosure of FIG. 1, shows clearly that the groove 40 or 42, or an equivalent groove, may be of any cross-sectional shape and depth which will accomplish the separation of the pivot points of the two sealing lips.

It will also be understood by those familiar with this art that the principles of this invention, as hereinbefore described, may be utilized not only in a seal wherein the sealing lips slidably engage a shaft but, also in seals which are rigidly mounted upon a shaft and wherein the sealing lips extend axially from the outer periphery of a radial web of a flexible sealing element and slidably engage a surface of or directly associated with a surrounding machine casing.

It should be obvious that the present concept may be utilized in various designs of dual-lip shaft seals without, however, departing from the invention as set forth in the following claims.

We claim:

1. A dual-lip seal for effecting a seal between two intertelescoped, relatively rotatable machine elements, said seal comprising an annular sealing element having means at one of its peripheries for effecting static sealing engagement with one of said machine elements, slide-sealing means at the other periphery of said sealing element for effecting sliding sealing engagement with the other of said machine elements, and an annular radial web extending between said means and including an unconfined resilient portion, of rubber-like material, which adjoins said slide-sealing means and has a cylindrical periphery adjacent to said slide-sealing means, and substantial, opposite side-face areas which are free of rigid confinement; said slide-sealing means comprising separate, annular, resilient, sealing lips extending axially in opposite directions from opposite sides of said unconfined resilient portion, in spaced relation to said other of said machine elements, and radially toward and into sliding sealing engagement with said other of said machine elements; and said unconfined resilient portion being formed with an annular groove therein, extending radially into said unconfined resilient portion from said cylindrical periphery, between said sealing lips, and the bottom of said groove defining the axially inner ends of separate hinge connections for said lips to said unconfined resilient portion, one of which connections, as viewed in an axial section, extends in a direction more nearly axial than radial, whereby to render radial flexing of each of said sealing lips substantially independent of and unaffected by radial flexing of the other of said sealing lips.

2. A seal according to claim 1, said slide-sealing means being at the inner periphery of said sealing element and adapted to effect a sliding sealing engagement with a shaft, and the other of said means being at the outer periphery of said sealing element and adapted to effect a static seal between said sealing element and a machine-casing opening through which the shaft extends.

3. A seal according to claim 1, the areas of said unconfined resilient portion, adjacent to each of said hinge connections and materially distortable upon flexing of said sealing lips at said connections, being sufficiently separated to prevent communication of distortion of the rubber-like material from either of said hinge connections to and through the other of said hinge connections.

4. A seal according to claim 1, said sealing lips having frusto-conical surfaces facing toward each other and facing said other of said machine elements, and said unconfined resilient portion having cylindrical surfaces adjoining said frusto-conical surfaces and adjacent sides of the mouth of said annular groove.

5. A seal according to claim 1, both of said hinge connections, as viewed in an axial section, extending in directions more nearly axial than radial.

References Cited in the file of this patent

UNITED STATES PATENTS

| | | |
|---|---|---|
| 2,173,247 | Bott | Sept. 19, 1939 |
| 2,257,119 | Johannssen | Sept. 30, 1941 |
| 2,676,040 | Dalton | Apr. 20, 1954 |
| 2,879,114 | Bowen | Mar. 24, 1959 |

FOREIGN PATENTS

| | | |
|---|---|---|
| 550,312 | Great Britain | Jan. 1, 1943 |
| 580,871 | Great Britain | Sept. 23, 1946 |